(12) United States Patent
Krüger

(10) Patent No.: US 6,183,014 B1
(45) Date of Patent: Feb. 6, 2001

(54) DEVICE FOR SEAT BELTS

(75) Inventor: Norbert Krüger, Essen (DE)

(73) Assignee: Ewald Witte GmbH & Co. KG, Velbert (DE)

(*) Notice: Under 35 U.S.C. 154(b), the term of this patent shall be extended for 0 days.

(21) Appl. No.: 09/200,018

(22) Filed: Nov. 25, 1998

(30) Foreign Application Priority Data

Nov. 28, 1997 (DE) .......................................... 297 21 035 U

(51) Int. Cl.[7] .................................................. B60R 22/28

(52) U.S. Cl. ....................... 280/805; 242/381.1; 297/470; 297/471

(58) Field of Search .............................. 280/805; 297/470, 297/471, 472; 242/381.1, 419.6, 419.7, 419.8; 188/371, 377

(56) References Cited

U.S. PATENT DOCUMENTS

| | | | | |
|---|---|---|---|---|
| 2,947,353 | * | 8/1960 | Wimmersperg | 297/470 |
| 3,371,960 | * | 3/1968 | Bayer et al. | 297/470 |
| 3,400,977 | * | 9/1968 | Jones | 297/470 |
| 3,431,019 | * | 3/1969 | Lewis et al. | 297/472 |
| 3,486,791 | * | 12/1969 | Stoffel et al. | 297/472 |
| 5,487,562 | * | 1/1996 | Hedderly et al. | 280/805 |

* cited by examiner

Primary Examiner—Lanna Mai
Assistant Examiner—Ruth Ilan
(74) Attorney, Agent, or Firm—Martin A. Farber

(57) ABSTRACT

A device for damping the belt tension which occurs in a seat belt (16) in the event of a momentary stress of great force. In order for momentary stresses of great force on the seat belt (16) to be able to be absorbed without injury being caused, the device has at least two reels (6, 14), rollers or the like which deflect the seat belt (16) from its straight-line extent and at least one (14) of which can yield elastically in the transverse direction of the extent when a preset maximum force is exceeded.

14 Claims, 3 Drawing Sheets

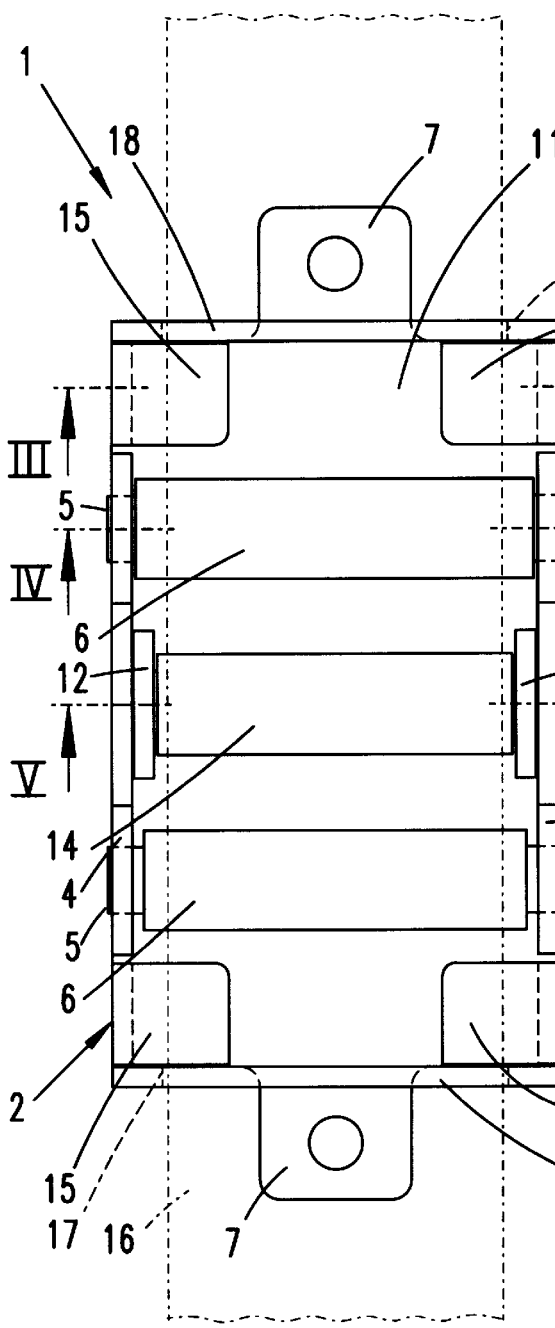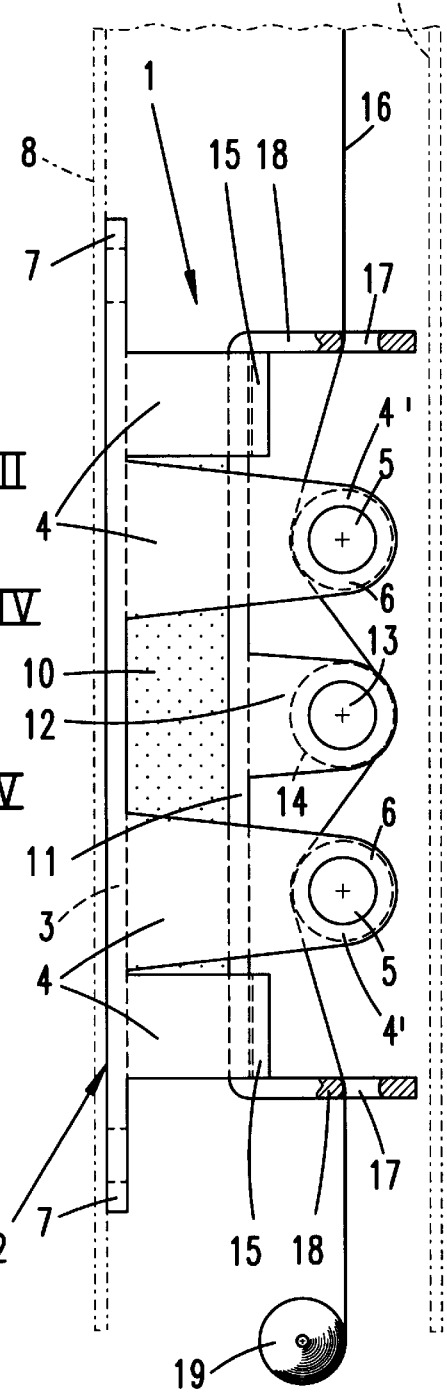

DEVICE FOR SEAT BELTS

FIELD AND BACKGROUND OF THE INVENTION

When belts in motor vehicles are worn, there occur, in the event of a crash or in the event of a sudden deceleration, momentary stresses of great force on the belt itself, resulting in the fabric of the seat belt stretching. Cases have even been known in which the belt itself tears, with the result that it is no longer able to carry out the safety function for which it is responsible.

SUMMARY OF THE INVENTION

It is an object of the invention to provide a seat belt such that momentary stresses of great force on the seat belt can be absorbed without injury being caused.

This object is achieved by a device for damping the belt tension which occurs in a seat belt in the event of a momentary stress of great force, having at least two reels, rollers or the like which deflect the seat belt from a straight-line extent and at least one of which can yield elastically in a transverse direction of the extent when a preset maximum force is exceeded.

As a result of a development of this type, a device of the type concerned having great safety value is provided. In the event of a normal stress of force, as results, for example when putting the seat belt on, or in the event of normal braking forces, there is no yielding movement of the appropriate deflection reel counter to its elastic support, since the stress does not exceed the preset maximum force. In contrast, in the event of a crash in which naturally a momentary stress of great force on the seat belt is effective, the elastically supported deflection reel is able to yield elastically because the preset maximum force is exceeded, with the result that force peaks which become effective in the seat belt due to deformation are smoothed over. The risk of the seat belt tearing or starting to tear is thus avoided. One or more deflection reels can be provided, depending on requirements, the reels yielding elastically when the preset maximum force is exceeded. The greater the number of these displaceable deflection rollers, the greater is the smoothing over of the force peaks. In detail, the device is provided in such a manner that the seat belt is guided in a wavy manner through at least three deflection reels situated in a row one behind another. Provision is made here for the central deflection reel to be supported by the pretensioned, elastic cushion. In order to achieve cost-effective production of the device, the latter has a housing which is U-shaped in cross section, has screw-on tabs and consists of bent steel plate. The U-limbs are used to mount the corresponding deflection reels. Furthermore, the U-shaped housing entails the advantage of arranging the elastic cushion, which in particular is made of foam, in the U-space, which elastic cushion is covered by a covering plate which bears the movable reel. At the preset maximum force, said covering plate is supported on the elastic cushion which, for its part, is supported on the U-shaped housing. The covering plate is held in the pretensioned position in a simple manner by means of holding tabs which are bent off from the U-limbs. It should furthermore be stressed that the axes of the deflection reels lie in a plane parallel to the U-web of the U-shaped housing. When the device according to the invention is arranged in a motor vehicle it is particularly advantageous to arrange the device on the body, between the belt retractor device and the outlet opening which is situated at shoulder height. In this case, the location may, for example, be on the B- or C-pillar. The device is of relatively low construction and so it is also possible, and favorable, to provide a cover for the device.

BRIEF DESCRIPTION OF THE DRAWINGS

With the above and other objects and other advantages in view, the present invention will become more clearly understood in connection with the detailed description of the preferred embodiment, when considered with the accompanying drawings of which:

FIG. 1 shows a side view of a device designed according to the invention and assigned to a motor vehicle, FIG. 2 shows a front view of the device.

DETAILED DESCRIPTION OF THE PREFERRED EMBODIMENT

Figure 3:
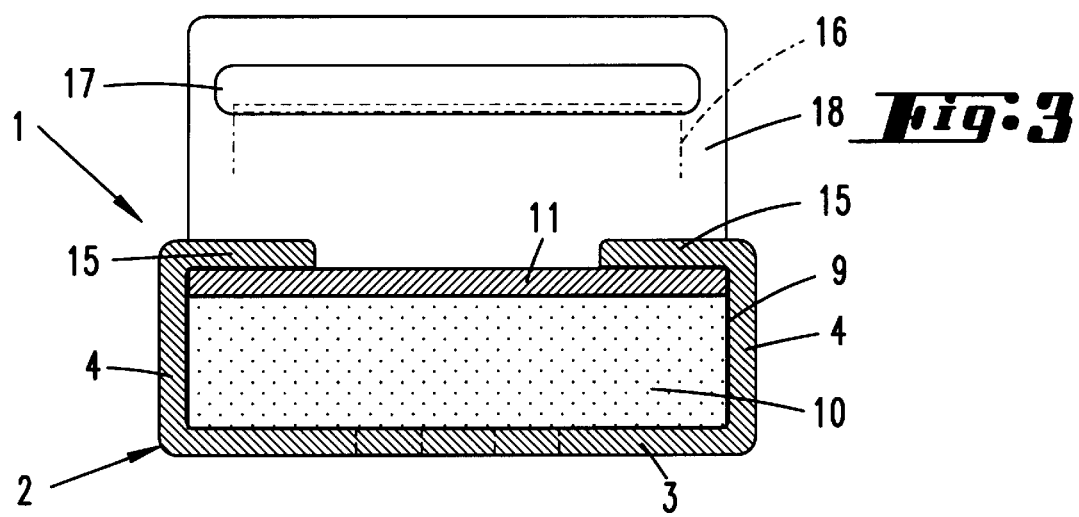
FIG. 3 shows the section according to the line III—III in FIG. 2.
Figure 4:
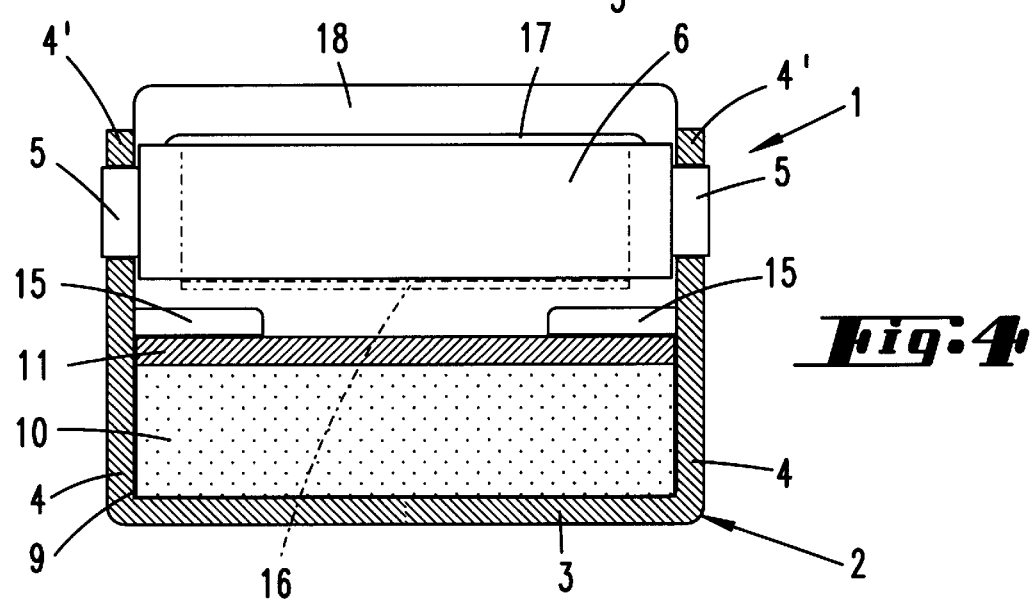
FIG. 4 shows the section according to the line IV—IV in FIG. 2.
Figure 5:
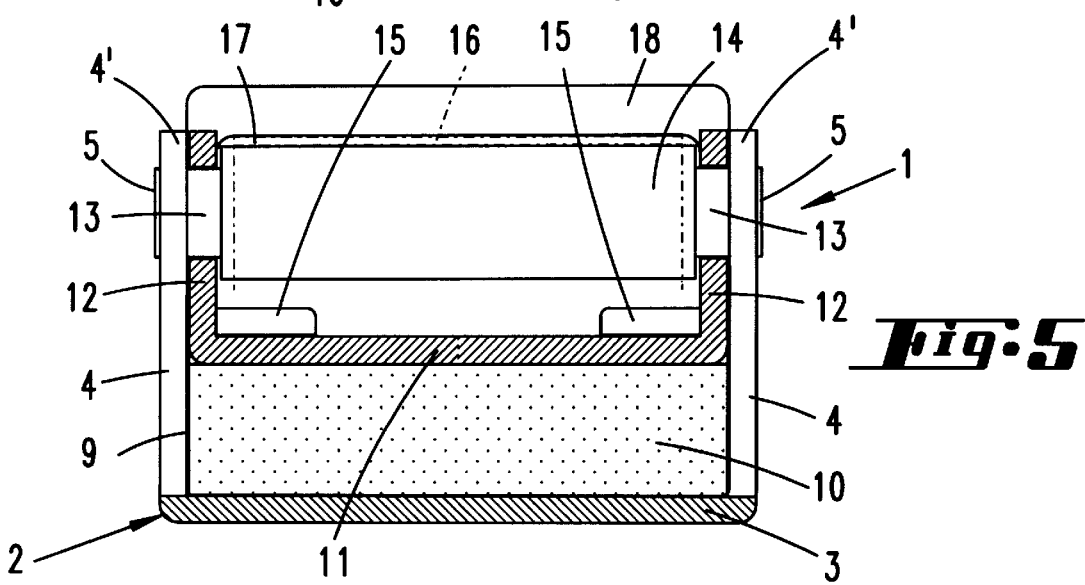
FIG. 5 shows the section according to the line V—V in FIG. 2
Figure 6:
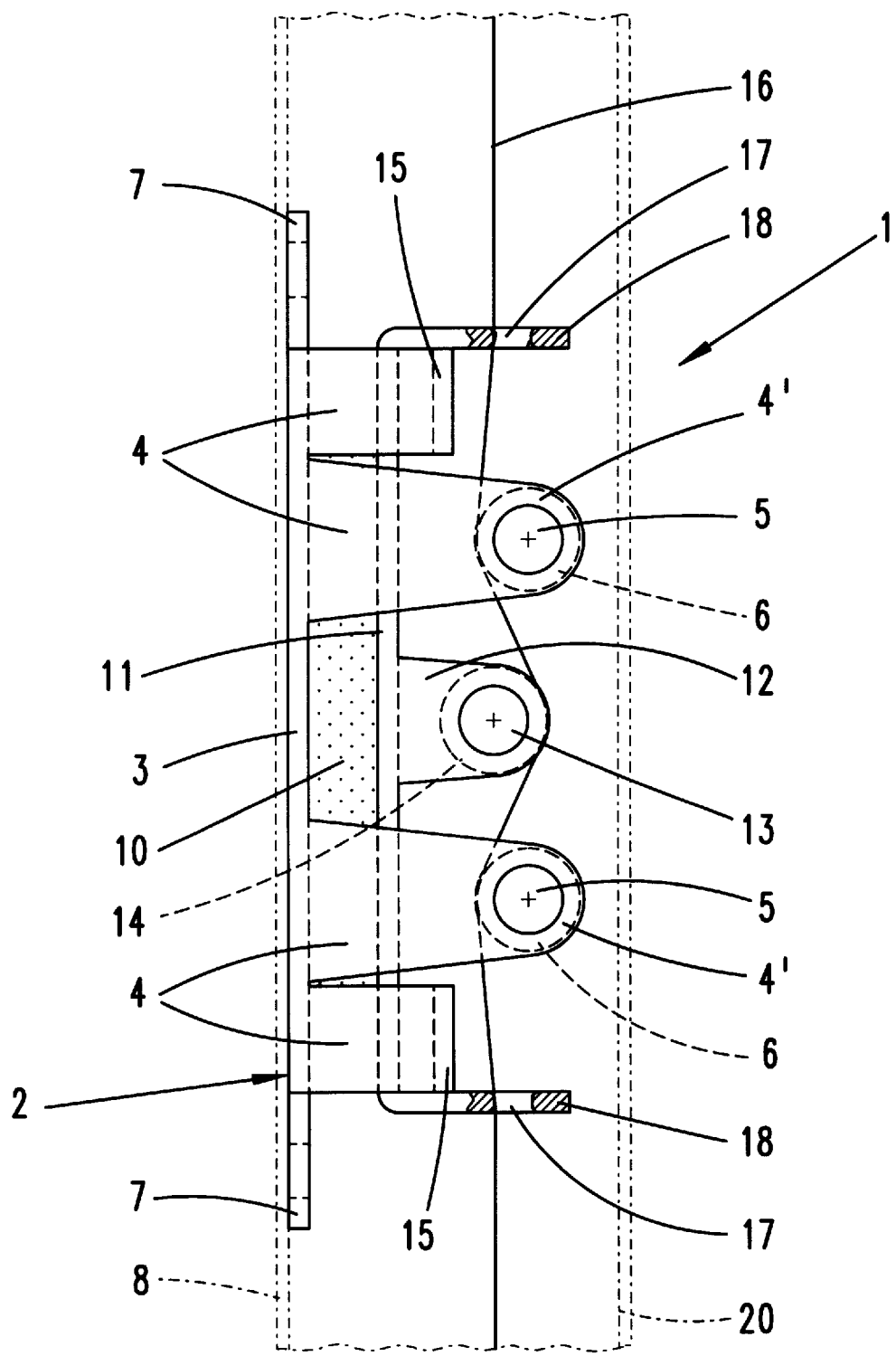
FIG. 6 shows a representation as in FIG. 1 but concerning the case of load being applied.

The device which is designated as a whole by the number 1 has a housing 2 which is essentially U-shaped in cross section. The housing consists of steel plate and has a U-web 3 which is formed as a supporting plate and has U-limbs 4 bent off from said housing. Each U-limb 4 forms two small bearing brackets 4' which are situated one behind the other in the longitudinal direction and are intended for holding the spindles 5 of deflection reels 6 in such a manner that the axes thereof run parallel to the U-web 3.

Screw-on tabs 7 protrude over the narrow edges of the U-web 3 in order to secure the device 1, for example, on a B-pillar 8 (dash-dotted lines) of a motor vehicle.

The U-space 9 serves to hold an elastic cushion 10 which in the embodiment consists of a suitable foam. The elastic cushion 10 is covered by a covering plate 11 which extends between the U-limbs 4. In the region between the two deflection reels 6 there are bent off from the covering plate 11 two bearing tabs 12 which are situated at the same height and into which the bearing spindles 13 of a central deflection reel 14, which is situated between the two deflection reels 6, engage. By means of holding tabs 15, which are bent off inward from the U-limbs, the covering plate 11 is held in a pretensioned position in which all of the axes of the deflection reels 6, 14 run parallel to the U-web 3.

By means of the deflection reels 6, 14 a seat belt 16 is guided through the device in a wavy profile. The wavy profile is such that the seat belt loops around the outside of the central deflection reel 14. Following the two outer deflection reels 6, the seat belt 16 leaves the device through guide slots 17 which are situated in tabs 18 which are bent upward from the end of the covering plate 11. The lower end of the seat belt 16 emerging from the device 1 is guided to a belt retractor device 19 (illustrated diagrammatically), while the upper end of the seat belt leaves an outlet opening (not shown), which is situated at shoulder height, in a panel 20 (shown by dash-dotted lines). The panel is secured to the B-pillar. The outlet opening can be provided in such a manner that it can be adjusted in its height in order to take account of differing heights of the people on the vehicle seat. The pretensioned position of the covering plate 11 is such that in the event of normal loads occurring on the seat belt 16, no change in position of the movable deflection reel 14 and hence of the covering plate 11 occurs. These normal loads result, for example, when the seat belt is put on and in the event of normal braking forces.

In the event of a momentary stress of great force, such as occurs, for example, in the event of a crash, the seat belt strives to take up a straight-line extent in the region of the wavy profile in the device 1. This leads to the central deflection reel 14 being displaced together with the covering plate 11 against the elastic cushion 10 and, connected therewith, the force peaks are smoothed over due to deformation of the elastic cushion. Damping thus occurs which protects the seat belt 16 from excessive stress and largely prevents the seat belt from starting to tear or tearing.

I claim:

1. A device for damping belt tension which occurs in a seat belt (16) in event of a momentary stress of great force, comprising deflection members comprising first reels (6) and an other reel (14) which deflect the seat belt (16) from a straight-line extent and wherein said other reel is interposed in a straight-line relationship between the first reels and which other reel (14) is yieldable elastically transversely with respect to said first reels to reposition the deflected seat belt toward the straight line extent.

2. The device as claimed in claim 1, wherein the seat belt (16) is guided in a wavy manner through said first and said other reels (6,14).

3. The device as claimed in claim 1, further comprising a pretensioned elastic cushion (10), and wherein said other reel (14) is supported by said elastic cushion (10).

4. The device as claimed in claim 1, further comprising a U-shaped housing (2) made of bent steel plate and which has screw-on tabs (7).

5. The device as claimed in claim 3, further comprising a U-shaped housing (2) wherein the elastic cushion (10) is seated in a U-space (9) of the housing (2) and is covered by a covering plate, (11) wherein said covering plate carries said other reel (14).

6. The device as claimed in claim 5, further comprising a housing having U-limbs and wherein the covering plate (11) is held in a pretensioned position by holding tabs (15) bent off from the U-limbs (4).

7. The device as claimed in claim 4, wherein axes of the reels (6, 14) lie in a plane parallel to a U-web (3) of the U-shaped housing (2).

8. The device as claimed in claim 1, wherein the device has a U-web plate (3) supporting said reels (6, 14) and formed with screw-on tabs (7) for attaching the device to a motor vehicle body between a belt retractor device (19) and an outlet opening approximately at shoulder height of an occupant of the vehicle.

9. The device as claimed in claim 5, wherein the elastic cushion is made of foam.

10. A device for damping tension occurring in a seat belt (18) subjected to a brief powerful load wherein said device comprises two fixed reels (6) and a movable central reel (14) which lies in a straight-line between the two fixed reels and which reels deflect the seat belt from its straight-line extent and said central reel is yieldable elastically in a transverse direction with respect to said fixed reels when a preset maximum force is exceeded by the belt to change the deflection of the seat belt and thereby dampen tension of the seat belt.

11. A device for damping belt tension which occurs in a seat belt (16) in event of a momentary stress of great force, comprising deflection members (6)and a central movable deflection member (14) interposed in a straight-line relationship between two of said deflection members which deflect said seat belt from a straight-line extent and wherein said device further comprises a pretensioned elastic cushion (10) supporting the central deflection member which is yieldable elastically transversely to reposition said deflected seat belt toward the straight line extent.

12. The device as claimed in claim 11, further comprising a U-shaped housing (2) wherein said elastic cushion is seated in a U-space (9) of said housing and is covered by a covering plate (11) wherein said covering plate carries said central deflecting member.

13. The device as claimed in claim 12, wherein said housing has U-limbs (4) and wherein said covering plate is held in a pretensioned position by holding tabs (15) bent off from said U-limbs (4).

14. The device as claimed in claim 12, wherein said elastic cushion is made of foam.

* * * * *